United States Patent

[11] 3,604,048

[72] Inventor Hubert Mainka
 Buhlertal, Germany
[21] Appl. No. 29,374
[22] Filed Apr. 8, 1970
[45] Patented Sept. 14, 1971
[73] Assignee Robert Bosch GmbH
 Stuttgart, Germany
[32] Priority Apr. 15, 1969
[33] Germany
[31] P 19 18 950.5

[54] WINDSHIELD WIPER MECHANISM
 10 Claims, 3 Drawing Figs.
[52] U.S. Cl. .................................................... 15/250.19,
 15/250.16, 15/250.34
[51] Int. Cl. .................................................... B60s 1/34
[50] Field of Search ............................................ 15/250.15,
 250.16, 250.17, 250.19, 250.2, 250.3, 250.34

[56] References Cited
 UNITED STATES PATENTS
| | | | |
|---|---|---|---|
| 956,770 | 5/1910 | Kellogg | 15/250.19 X |
| 1,564,514 | 12/1925 | Blackmore | 15/250.16 |
| 1,610,361 | 12/1926 | Colvin | 15/250.19 |
| 1,639,778 | 8/1927 | Locke | 15/250.16 |
| 3,292,196 | 12/1966 | Windorf | 15/250.19 X |

FOREIGN PATENTS
| | | | |
|---|---|---|---|
| 201,838 | 4/1955 | Australia | 15/250.34 |

*Primary Examiner*—Peter Feldman
*Attorney*—Michael S. Striker

ABSTRACT: A stationary pin is mounted on a motor vehicle adjacent the windshield thereof. A sleeve is journaled for turning movement on the pin and has limited freedom of axial displacement relative to the same. A pair of arms project from this sleeve at opposite radial sides. A windshield wiper assembly is mounted on one of the arms and biassed into engagement with the windshield. Drive means is coupled with the second arm for imparting to the same and thereby to the sleeve an oscillatory movement about the pin which, at the will of an operator, may be varied from effecting displacement of the wiper assembly between two operating positions to effecting displacement of the wiper assembly from one of the operating positions to a rest position. Guide means in form of cooperating cam and follower means is provided for imparting to the sleeve in automatic response to movement of the assembly to its rest position, an axial movement with reference to the pin in a sense exerting upon the wiper assembly a second biassing force counter to the first biassing force so that the same is either partially negated or completely negated, with the wiper assembly in the latter case being lifted off the windshield.

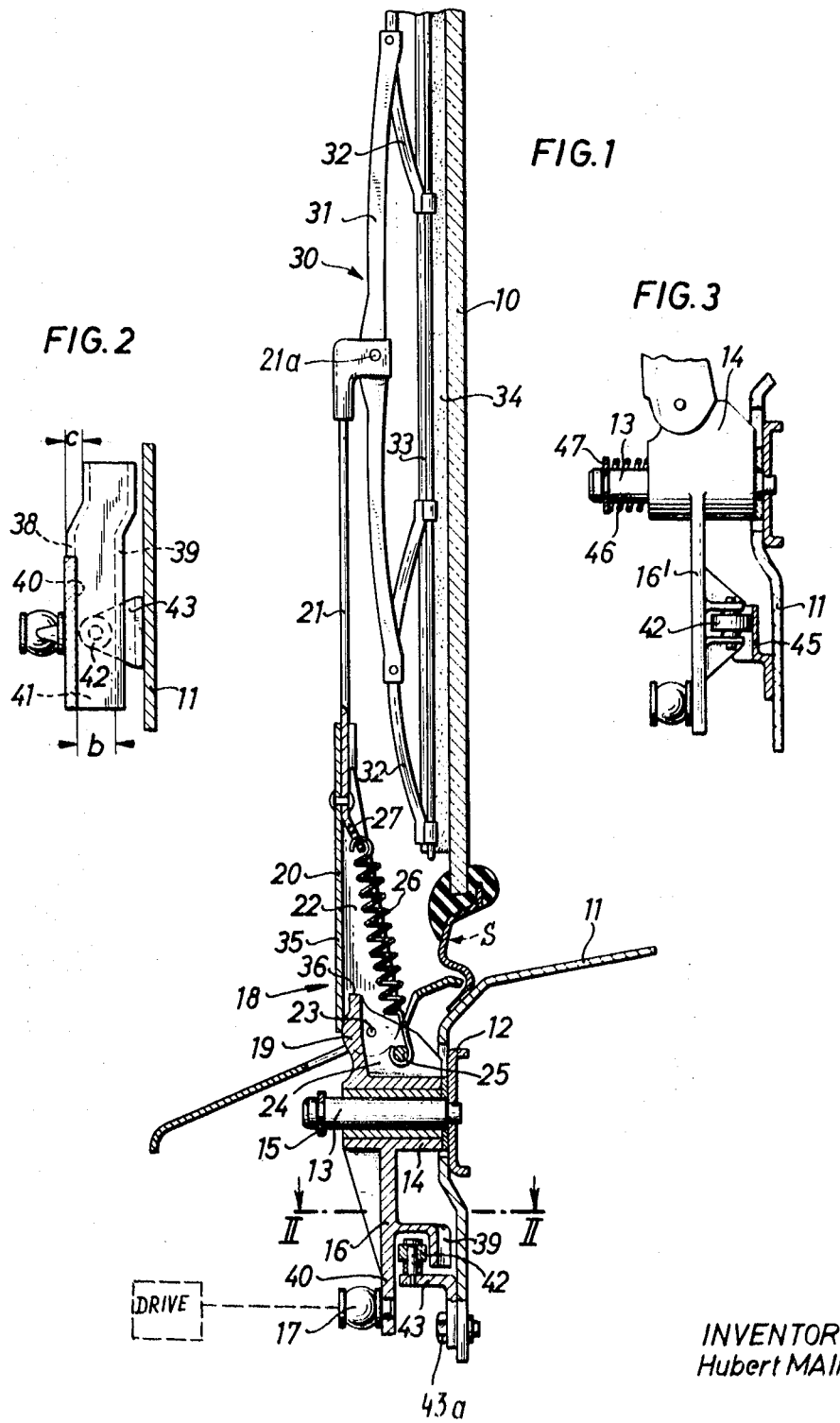

WINDSHIELD WIPER MECHANISM

BACKGROUND OF THE INVENTION

The present invention relates generally to windshield wiper mechanisms, and more particularly to windshield wiper mechanisms for vehicles, especially for motor vehicles.

Known windshield wipers perform an oscillatory movement with reference to a windshield, in the sense that they are displaced between two angularly spaced working or terminal positions, and are further capable of movement to a rest position which is located beyond one of the working positions and in which the wiper assembly is positioned outside the field of vision which is traversed by the assembly when it moves between its operating positions. To assure proper cleaning of the windshield and removal of all contaminants, liquid, etc. therefrom, the windshield wiper assembly is biassed into engagement with the windshield. The wiper blade itself, however, consists of rubber or a suitable synthetic plastic substitute, and over a period of time the constant biassed engagement of the blade with the windshield causes a deterioration of the characteristics of the wiper blade material, and therefore in the effectiveness of the wiping action performed by the blade. It is therefore known to provide an inclined surface or cam face which cooperates with the arm on which the wiper blade is mounted in such a manner that, when the arm and thereby the blade moves to rest or parking position, the blade is lifted off the windshield so as to be free from stress while the wipers are not in use. It has been found, however, that in many instances space limitations make it impossible to provide such an inclined cam face, or else force the provision of the cam face at a location of the vehicle which possesses unacceptable problems, either from a point of view of aesthetics or else with reference to operational considerations, for instance if the location is such that in winter a freezing of the windshield wiper arm to the cam face must be feared.

SUMMARY OF THE INVENTION

It is, accordingly, an object of the present invention to overcome the aforementioned problems.

More particularly it is an object of the present invention to provide an improved windshield wiper mechanism which is not possessed of these problems.

Still more specifically, it is an object of the present invention to provide an improved windshield wiper mechanism which affords in a most simple manner either a reduction in the force with which the blade engages the windshield, or a complete lifting-off of the blade from the windshield in automatic response to movement of the wiper assembly to rest or parking position.

In pursuance of the above objects, and others which will become apparent hereafter, one feature of the invention resides in a windshield wiper mechanism, particularly for use in motor vehicles, which briefly stated comprises a support and a stationary pin mounted on this support. A sleeve is journaled for turning movement on the pin and has limited freedom of axial displacement relative to the same. A first arm projects from the sleeve at one radial side and a second arm projects from the sleeve at another radial side. A wiper assembly is mounted on the first arm under the influence of a first biassing force tending to move it into engagement with a proximal windshield. Drive means is coupled with the second arm for imparting to the same and thereby the sleeve an oscillatory movement about the pin in a sense effecting displacement of the wiper assembly between two operating positions, and at the will of an operator effecting displacement of the wiper assembly from one of the operating positions to a rest position. Finally, I provide guide means operative for imparting to the sleeve in automatic response to displacement of the assembly to the aforementioned rest position, an axial movement relative to the pin in a sense exerting upon the wiper assembly a second biassing force which is counter to the first biassing force. This second biassing force may negate the first biassing force partially or completely, and in the former case the blade of the wiper assembly will engage the windshield with reduced force, whereas in the second case the blade will be lifted off the windshield in its entirety.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a partly section side view of a windshield wiper mechanism according to one embodiment of the present invention, installed in a vehicle;

FIG. 2 is a section taken on the line II—II of FIG. 1; and

FIG. 3 is a fragmentary detail view analogous to FIG. 1, but illustrating a further embodiment of the invention in partial section.

DESCRIPTION OF THE PREFERRED EMBODIMENTS

Discussing now the drawing in detail, and firstly the embodiment in FIGS. 1 and 2, it will be seen that reference numeral 10 identifies a windshield of a vehicle, for instance—but not necessarily—a motor vehicle. The windshield is mounted on a support 11, and reference character S identifies a somewhat diagrammatically illustrated seal which prevents the entry of air and rain at the juncture between the windshield 10 and the support 11. The support 11 may, of course, be a portion of the body of a motor vehicle or the like.

In any case, the support 11 is reinforced by a traverse 12 which is of substantially U-shaped cross-sectional configuration. A pin 13 is mounted on the traverse 12 and journaled for turning movement on the pin 13 is a sleeve 14. The latter also has limited freedom of axial displacement with reference to the pin 13, and adjacent the free end of the latter there is provided a conventional circlip or spring ring 15 against which the sleeve 14 will eventually abut when it moves axially of the pin 13, so that its freedom of axial displacement is limited by the circlip 15.

As FIG. 1 shows, two arms project from the sleeve 14 at different radial sides thereof. These arms may be rigid with the sleeves 14 or they may be of one piece therewith, as illustrated in FIG. 1. One of the arms is identified with reference numeral 16 and it carries at or adjacent its free end a ball pivot 17 by means of which it is connectable with a rod which is in turn connected with a motor crank of a drive. The drive and the connection thereof with the ball pivot 17 are diagrammatically suggested by the dotted lines because such connection is well known to those skilled in the art, as is the type of drive in question. It will be appreciated that the circular movement of the motor crank of the drive is converted into an oscillatory movement of arm 16 and sleeve 14 about the pivot pin 13. It is further known to those skilled in the art, and will therefore not be separately discussed because it does not in itself constitute a part of the present invention, how movement of the sleeve 14 in a sense effecting displacement of the windshield wiper assembly 30 to rest position—rather than displacement between the two end positions located at opposite sides of the wiping field—is effected. In any case, it is briefly pointed out that when the drive is deactivated, the wiping assembly moves beyond one of the end positions out of the wiping field to a rest or parking position where it remains until the drive is again activated.

A second arm 19 is of one piece with the sleeve 14 also, which projects from the latter at a side opposite that from which the arm 16 projects. The arm 19 is a part of a wiper arm 19 composed of the arm 19, a connecting portion 20 which advantageously consists of formed sheet metal, and an elongated straight rod 21. The cross-sectional configuration of the connecting portion 20 is U-shaped, in known manner. Its two lateral arms 22 embrace the arm 19 with small play. The portion 20 and the rod 21, which is connected to it by means of rivets or the like, are mounted on the arm 19 turnable about a bolt or pin 23. A further bolt or pin 25 traverses a recess 24 provided in the arm 19, and one end of a tension spring 26 engages the bolt or pin 25 whereas the other end of the spring 26 engages a projection 27 of the rod 21. Secured to the free end of the arm 18, that is more specifically to the free end of the rod 21, is a wiper assembly 30 which is pivotable about a pivot 21a. In known manner the assembly 30 is composed of a support member 31, two intermediate members 32 and a wiper blade 34 which is reinforced with one or more springy elements 33—of spring steel or the like—with the blade 34 being composed of rubber or a suitable synthetic plastic material. The spring 26 tends to displace the arm 18 with reference to the arm 19 in clockwise direction, thereby urging the blade 34 into abutment with the windshield 10. A nose 36 on the arm 19 is so positioned that it will not normally come into contact with the transverse wall 36 of the portion 20 as long as the assembly 30 is in operating position in which it wipes the windshield 10.

In accordance with the present invention, and more particularly the embodiment illustrated in FIGS. 1 and 2, there are provided two guide rails 38 and 39 which extend in parallelism with one another as evident from FIG. 2, and which are formed on the arm 16. Together with a planar portion 40 of the arm 16 these rails define a channel-shaped cam track 41 for a roller 42 which is turnably mounted on a bracket 43 for turning movement about an axis of rotation normal to the axis of the pin 13. The bracket 43 is mounted releasably on the support 11 by means of suitable connecting means, such as for instance a nut and bolt assembly 43a.

As FIG. 2 shows particularly clearly, the diameter of the roller 42 is somewhat smaller that the width b of the cam track 41 so that the roller can turn freely when the arm 16 and the sleeve 14 oscillate in response to having motion transmitted to them from the drive. One end of the cam track 41 (compare FIG. 2) is offset by a distance c towards the support 11.

When the drive is energized and the arm 16 and sleeve 14 oscillate about the pin 13 in the sense causing displacement of the assembly 30 between its two operative positions, the cam track 41 moves with reference to the roller 42, but the latter does not enter into the offset portion which is illustrated in FIG. 2. Thus, the spring 26 urges the blade 34 into wiping engagement with the windshield 10.

When the drive is deactivated, the sleeve 14 is caused in conventional and therefore nonillustrated manner to turn about the pin 13 beyond its normal angular displacement—that is beyond the displacement range which it traverses while the drive is in operation and the wiper assembly 30 wipes the windshield 10—so that the assembly 30 moves to a rest or parking position in which the assembly 30 is located outside the wiping field which is normally traversed when the wiper is in motion. As this movement of the assembly 30 to its rest position takes place, the laterally offset portion of the cam track 41 (compare FIG. 2) is so displaced with respect to the roller 42 that the latter enters into this offset portion and, because the axis about which the roller 42 rotates is stationary, the cam track 41 and of course thereby the arm 16 and the sleeve 14 are caused to become displaced towards the left-hand side in FIGS. 1 and 2, so that the sleeve 14 moves away from the windshield 10. Initially, this displacement does not cause lifting of the blade 34 off the windshield 10 because the spring 26 compensates for such displacement in that it continues to urge the arm 18 to pivot about the pivot pin 23 towards the right and to thereby maintain engagement of the blade 34 with the windshield 10. However, and this takes place in the last third of the axial displacement of the sleeve 14 with reference to the pin 13, the transverse wall 35 of the portion 20 will finally abut against the nose 36 of the arm 19, preventing further displacement of the arm 18 about the pivot 23 towards the right in FIG. 1, so that during continued left movement of the sleeve 14 with reference to the pin 13 until the sleeve 14 engages the circlet 15, the blade 34 is lifted off the windshield 10. In this position the assembly 30 remains while the windshield wiper mechanism is not in use. Of course, when the drive is energized and the windshield wiper mechanism is intended to be used, then the reverse takes place.

In the embodiment of FIG. 3 the roller 42 is mounted on the arm 16', which is fast with or of one piece with the sleeve 14. The cam track in this embodiment is constituted by a sheet metal cam 44 which is secured to the support 11 and configurated correspondingly as required, that is analogously to what has been shown in FIG. 2. A helical spring surrounds the pin 13 intermediate the circlip 47 or other abutment provided in place of the circlip, and the free axial end of the sleeve 14, urging the same towards the right and thereby urging the roller 42 into engagement with the cam track 45.

It will be appreciated that among the various modifications which can be made in the illustrated embodiments without departing from the scope and intent of the present invention, there is the possibility of having the biasing force exerted by leftward movement of the sleeve 14 (see FIG. 1) with reference to the pin 13 be such that it is not sufficient to lift the blade 34 entirely off the windshield 10, but only to counteract to a desired extent the biasing force of the spring 26, so that the blade 34 would still engage the windshield 10 but with reduced force. It is also possible to so construct the cam tracks that they impart to the sleeve 14 an axial displacement with reference to the pin 13 which is smaller than the one imparted when the assembly 30 moves to rest position, but which takes place while the assembly 30 actually operates and is being displaced between its two operating positions. This embodiment could be advantageous if the windshield 10 is particularly strongly curved.

It will be understood that each of the elements described above, or two or more together, may also find a useful application in other types of constructions differing from the types described above.

While the invention has been illustrated and described as embodied in a windshield wiper mechanism, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A windshield wiper mechanism, particularly for use in motor vehicles, comprising a support; a stationary pin mounted on said support; a sleeve journaled for turning movement on said pin and having limited freedom of axial displacement relative to the same; a first arm projecting from said sleeve at one radial side and a second arm projecting from said sleeve at another radial side; a wiper assembly mounted on said first arm under the influence of a first biasing force tending to move it into engagement with a proximal windshield; drive means coupled with said second arm for imparting to the same and thereby said sleeve an oscillatory movement about said pin in a sense effecting displacement of said wiper assembly between two operating positions, and at the will of an operator from one of said operating positions to a rest position; and guide means operative for imparting to said sleeve in automatic response to displacement of said assembly to said rest position, an axial movement relative to said pin in a sense exerting upon said wiper assembly a second biasing force counter to said first biasing force.

2. A mechanism as defined in claim 1, said guide means comprising cam means and cam follower means one of which is provided on said support and the other of which is provided on said second arm.

3. A mechanism as defined in claim 2, said cam means being provided on said second arm, and said cam follower means being provided on said support.

4. A mechanism as defined in claim 3, said cam means comprising an elongated cam track provided on said second arm, and said cam follower means comprising a roller cooperating with said cam track and mounted on said support for turning movement about an axis transverse to the elongation of said cam track.

5. A mechanism as defined in claim 1; further comprising biassing means engaging said wiper assembly and exerting upon the same said first biassing force.

6. A mechanism as defined in claim 2, said cam means comprising a cam track provided on said support and being elongated in direction normal to the axis of said pin, and said cam follower means comprising a roller mounted on said second arm for turning movement about a rolling axis normal to the axis of said pin and to the elongation of said cam track.

7. A mechanism as defined in claim 6; further comprising a biassing spring engaging said sleeve and tending to displace the same axially of said pin in a sense effecting engagement of said roller with said cam track.

8. A mechanism as defined in claim 4, said cam track being in form of a channel having an open side through which said roller extends into said channel.

9. A mechanism as defined in claim 4, said cam track having a first track portion along which said roller moves during displacement of said wiper assembly between said operating positions, and a second track portion offset with reference to said first track portion and into engagement with which said roller moves in response to displacement of said wiper assembly to said rest position.

10. A mechanism as defined in claim 7, said pin having an axial length greater than that of said sleeve and being provided with a free end; further comprising a circlip encircling and connected with said free end; and wherein said biassing spring is helical and surrounds said pin intermediate said circlip and said sleeve bearing against both with opposite ends.